United States Patent [19]

Kumar et al.

[11] Patent Number: 5,411,802
[45] Date of Patent: May 2, 1995

[54] COLORANT COMPOSITIONS AND PROCESSES

[75] Inventors: Kanta Kumar, Maplewood; Robert A. Davis, Cottage Grove; Howard J. Buttery, Newport, all of Minn.

[73] Assignee: Minnesota Mining and Manufacturing Company, St. Paul, Minn.

[21] Appl. No.: 145,492

[22] Filed: Oct. 29, 1993

[51] Int. Cl.$^6$ ................................................ B32B 5/16
[52] U.S. Cl. ...................................... 428/402; 528/230; 528/232; 528/243; 528/248; 528/254; 528/256; 528/265; 424/70.6; 8/405
[58] Field of Search ............... 528/230, 232, 243, 248, 528/254, 256, 266; 424/70, 71; 428/402

[56] References Cited

U.S. PATENT DOCUMENTS

| | | | |
|---|---|---|---|
| 2,938,873 | 5/1960 | Kazenas | 252/301.35 |
| 3,412,034 | 11/1968 | McIntosh et al. | 252/301.35 |
| 3,519,941 | 7/1970 | Winder | 377/106 |
| 3,620,993 | 11/1971 | Takano et al. | 524/83 |
| 3,795,628 | 3/1974 | Noetzel | 252/301.35 |
| 3,812,051 | 5/1974 | Merkle et al. | 252/301.35 |
| 3,919,110 | 11/1975 | Vassiliades et al. | 252/316 |
| 3,928,122 | 12/1975 | Griffiths et al. | 162/166 |
| 3,945,980 | 3/1976 | Tsubakimoto et al. | 524/843 |
| 4,069,176 | 1/1978 | Tsubakimoto et al. | 523/333 |
| 4,307,005 | 12/1981 | Renner et al. | 260/29.4 |
| 4,328,119 | 5/1982 | Iwasaki et al. | 252/316 |
| 4,861,379 | 8/1989 | Imai et al. | 106/402 |
| 4,945,121 | 7/1990 | Micale et al. | 523/339 |
| 5,002,075 | 3/1991 | Kellett et al. | 132/108 |
| 5,043,013 | 8/1991 | Kluger et al. | 106/22 |
| 5,143,723 | 9/1992 | Calvo et al. | 424/63 |

FOREIGN PATENT DOCUMENTS 0456610 4/1991 European Pat. Off. .
0501063 9/1991 European Pat. Off. .

*Primary Examiner*—Samuel A. Acquah
*Attorney, Agent, or Firm*—Gary L. Griswold; Walter N. Kirn; Dale A. Bjorkman

[57] ABSTRACT

A process for making solid colored particles by preparing a reaction solution in water comprising formaldehyde, urea, a cyclic polyamine functional triazine compound, and acid. A dye can be incorporated into the reaction solution if a color other than white is desired. Particles are formed having an average particle size between 1 and 70 microns without the need to resort to crushing to break up agglomerates. Particles made by this process provide excellent color and are easily washable from a substrate when incorporated into a washable formulation.

Additionally, it has been found that the incorporation of colored microcapsules of average size of 1–70 microns where the color is located primarily on or in the shell of the microcapsule also provides excellent washable compositions when incorporated into a washable formulation.

16 Claims, No Drawings

COLORANT COMPOSITIONS AND PROCESSES

TECHNICAL FIELD

The present invention relates to compositions containing a colorant and to colored particles. More specifically, the present invention relates to a process for making colored particles, the particles made by that process, compositions containing such particles and certain compositions containing colored microcapsules.

BACKGROUND OF THE INVENTION

Materials for imparting color to substrates have long been known in the art. Such materials include pigments, dyes and lakes. Compositions containing such materials are specially formulated for application to specific substrates. For example, hair colorant compositions contain components suitable for application to the human head. Paint compositions are formulated for application to walls and the like, or to fabric for decorating clothing or to paper or canvas for creation of works of art. In many such applications it is desired that the color of the composition be permanent to the intended substate. Often such compositions also impart permanent coloration to unintended substrates as well through spills and other accidental applications of such compositions.

Some products are sold as hair colorants or paint compositions that profess to be washable, but may not be very easily removed from unintended substrates. Formulations having a solvated dye in solution must balance the often conflicting properties of having an easily perceptible color and having a composition that is readily washable.

U.S. Pat. No. 5,043,013 to Kluger et. al. discloses washable ink compositions comprising an aqueous mixture of one or more polymeric colorants having polar components and chromophore components.

U.S. Pat. No. 3,945,980 to Tsubakimoto et. al. relates to finely divided colored or uncolored hardened resins that are the reaction product of benzguanamine or benzguanamine/melamine with formaldehyde. This mixture is introduced to a protective colloid with stirring to prepare an emulsion. A curing catalyst is added to this emulsion and the mixture is heated to effect hardening. This hardened resin is then an agglomerated product that must then be washed, dried and crushed to provide small particles. After crushing of the agglomerates, particles are obtained in the size order of 0.1–10 microns.

U.S. Pat. No. 4,069,176 to Tsubakimoto et. al. relates to finely divided colored or uncolored hardened resins that is the reaction product of benzguanamine with formaldehyde. The reaction product as disclosed must be deaggregated.

European Patent Application No. 501,063 to Nakahara discloses spherical fine particles of colored resin made by incorporating an amino resin cured matter and an inorganic pigment into one body.

U.S. Pat. No. 5,143,723 to Calvo et. at. dislcoses colored cosmetic compositions comprising a pigment formed by incorporating a solvated dye into a resin and a cosmetic carrier having this pigment admixed therein. The pigments so formed are pulverized into a powder having a desired size distribution. See column 4, lines 46–56. Included among the resins utilized are malamine-formaldehyde resins and urea-formaldehyde resins at column 3, lines 45 and 60, respectively.

SUMMARY OF THE INVENTION

A process is provided for making solid colored particles by preparing a reaction solution in water comprising formaldehyde, urea, a cyclic polyamine functional triazine compound, and acid. This mixture forms a reaction solution that has only a water phase and a polymer phase. A dye can be incorporated into the reaction solution if a color other than white is desired. The reaction solution is heated under high shear mixing to polymerize the reactive components of the solution, forming particles having an average particle size between 1 and 70 microns without the need to resort to crushing to break up agglomerates. Particles made by this process provide excellent color and are easily washable from a substrate when incorporated into a washable formulation.

Additionally, it has been found that the incorporation of colored microcapsules of average size of 1–70 microns where the color is located primarily on or in the shell of the microcapsule also provides excellent washable compositions when incorporated into a washable formulation.

As used herein, "washable" from fabric means that a substantial amount of the material is removed from the fabric by two washings in accordance with the fabric manufacturer's washing instructions and with no stain pretreatment or other extraordinary cleaning step.

As used herein, "washable" from hair means that a substantial amount of the material is removed from hair after one shampooing using warm water and any commercially available shampoo formulation.

DETAILED DESCRIPTION

It has been found that color-imparting particles may be readily formed in a size and shape suitable for incorporation into washable formulations without the need for post-reaction physical processing to break up agglomerates or separate grinding steps to provide particles having the appropriate mean particle size for the intended use. Dyes may be readily incorporated into the particles, which particles will provide excellent perceptible color. The particles so prepared have an average particle size of 1–70, and preferably 11–30 microns. Particles of this size range and of spherical or oblate shape have been found to be particularly washable from fabrics or hair. Smaller particles tend to be entangled in the fibers of fabric, and are difficult to wash out. Particles that have been ground from larger pieces of resin have rough edges that have a negative effect on washability of such particles from a substrate.

The particles formed in the present process do not contain monocore nucleating agents, such as metal pigments or the like. It has been found that particles that do not contain such nucleating agents are particularly washable from substrates from which removal is desired. While not being bound by theory, it is believed that nucleating agents affect the density or shape of the particle formed, rendering nucleated particles more difficult physically to remove. It is also possible that the nucleating agent is not fully enveloped by the resin, providing different surface effects and similarly being more difficult to remove.

In another aspect of this invention, it has been found that the addition of a C 2–6 straight or branched chain dialdehyde to the reaction solution before polymerization of the reactive components provides particular beneficial results. Glutaraldehyde or glyoxal are particularly preferred. Specifically, the incorporation of dialdehydes in this manner induces full polymerization of the resin system in a much shorter time, with reductions of the reaction time from about 16 hours to 8 hours being common. Additionally, it has been found that incorporation of the dialdehyde allows one to decrease the pH of the reaction solution without formation of agglomerates, which in turn increases the efficiency of the dye uptake of the resin during particle formation. Because reaction solutions containing dialdehyde take up more of the dye from the solution, the remaining mother liquor contains significantly less dye. This greatly reduces the problems of disposal of reaction waste products, providing a more environmentally friendly manner of forming washable colorants.

The reaction to form the particles is essentially a modified aminoplast reaction. A discussion of aminoplasts and aminoplast precursors appears in C. P. Vale's book "Aminoplasts," published in 1950 by Interscience Publishers, Inc.

The resins of the present invention may be prepared using as reactants either formaldehyde or its polymer, paraformaldehyde, which polymer has the general formula

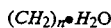

$(CH_2)_n \cdot H_2O$ where n equals 6+. This monomer and its polymer should be distinguished from polyaldehydes such as glyoxal containing a plurality of aldehyde groups in a stable molecule.

The cyclic aminotriazine compound may comprise a compound having at least two amino groups as represented by the following formula:

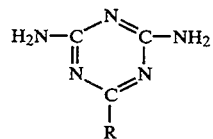

wherein R is hydrogen, alkyl (preferably less than nine carbon atoms), aryl, aralkyl, amino, and the like.

The following are typical aminotriazine compounds within the above formula:
2,4-diamino-1,3,5-triazine
2-methyl-4,6-diamino-1,3,5-triazine
2(3-hydroxy butyl)-4,6-diamino-1,3,5-triazine
2-heptyl-4,6-diamino-1,3,5-triazine
2-phenyl-4,6-diamino-1,3,5-triazine
2-benzyl-4,6-diamino-1,3,5-triazine
2,4,6-triamino-1,3,5-triazine (melamine)
In place of melamine as the aminotriazine compound, one can use methyl melamine or other alkyl derivatives of melamine (i.e., N-alkyl melamines), such as the mono- or dialkyl derivatives where the alkyl group may be methyl, ethyl, propyl, butyl, and the like, up to about eight carbon atoms. Also useful is benzguanamine and its derivatives.

The relative quantities of the materials to be cocondensed are critical only to the extent that sufficient aldehyde should be used to produce a completely condensed product.

The reaction of the components provided in the reaction solution is acid catalyzed. Any appropriate acid for use in aminoplast-type reactions may be used. Either organic or mineral acids may be used, and specific examples include sulfuric acid, paratoluene sulphonic acid, hydrochloric acid and citric acid.

It is particularly preferred to incorporate one or more anti-agglomeration agents in the reaction solution to help form discrete particles and control particle size without undue agglomeration. It is possible, however, to carry out the presently described reaction to form such non-agglomerated particles without such anti-agglomeration agents. Preferred antiagglomeration agents include colloidal silica, carboxy methyl cellulose and polyvinyl alcohol.

The particles of this invention are formed by the incorporation of a solvated dye into the resin, with the resultant coloring of the resin. Without being bound by any theory, it is believed that the solvated dye is absorbed into, encapsulated, enveloped or entrapped by the resin, dispersed throughout the resin, or dissolved in the resin, depending on the particular dyes and resins used and the method used to incorporate the dye into the resin. Accordingly, for the purposes of this application, "incorporate" or "incorporation" are general terms used to describe the coloring of a resin by a solvated dye, and is meant to encompass the dispersion, entrapment, encapsulation, envelopment, dissolution etc., of the solvated dye in the resin, with resultant coloration of the resin.

Any suitable dye may be used in the practice of the present invention, including oil and water soluble dyes. It is desirable to use a dye that is approved for drug and cosmetic use (D&C dyes) or food, drug and cosmetic use (FD&C dyes). The preferred dyes for use in the compositions of this invention are water-soluble dyes. Appropriate dyes include FD&C Blue No. 1, FD&C Blue No. 2, FD&C Green No. 3, FD&C Red No. 3, FD&C Red No. 40, FD&C Yellow No. 5, FD&C Yellow No. 6, D&C Blue No. 4, D&C Blue No. 9, D&C Green No. 5, D&C Green No. 6, D&C Green No. 8, D&C Orange No. 4, D&C Orange No. 5, D&C Orange No. 10, D&C Orange No. 11, D&C Orange No. 17, FD&C Red No. 4, D&C Red No. 6, D&C Red No. 7, D&C Red No. 8, D&C Red No. 9, D&C Red No. 17, D&C Red No. 19, D&C Red No. 21, D&C Red No. 22, D&C Red No. 27, D&C Red No. 28, D&C Red No. 30, D&C Red No. 21, D&C Red No. 34, D&C Red No. 39, FD&C Red No. 40, D&C Violet No. 2, D&C Yellow No. 7, Ext. D&C Yellow No. 7, D&C Yellow No. 8, D&C Yellow No. 11, D&C Brown No. 1, Ext. D&C Violet No. 2, D&C Blue No. 6 and D&C Yellow No. 10. Such dyes are well known, commercially available materials, with their chemical structure being described, e.g., in 21 C.F.R. Part 74 (as revised Apr. 1, 1988) and the CTFA Cosmetic Ingredient Handbook, (1988), published by the 0 Cosmetics, Toiletry and Fragrancy Association, Inc.

For certain colors, it has been found that a subsequent heat treatment of the particles or of colored microcapsules enhances the color-fast nature of the materials. To carry out such heat treatment, the particles or microcapsules are air dried and subsequently heated in an oven for a time and temperature sufficient to reduce the water content of the particles or microcapsules below about 2% by weight. Preferably, the particles or microcapsules are heated at about 100° C. for at least two hours. Alternatively, the air drying step may be omitted, provided that the heating is carried out without causing agglomeration of the particles or microcapsules.

As an alternative embodiment of the present invention, it has surprisingly been discovered that incorporation of colored microcapsules in washable formulations provides excellent colorful compositions that are quite readily washable. It is important to note that the colorant in the microcapsule must be located on the shell or in the shell, rather than encapsulated within the core of the microcapsule, for optimal color perception of washable formulations containing these microcapsules. Washable compositions comprising both colored microcapsules and colored particles are also contemplated.

In accordance with the present invention, microcapsules are prepared by in situ processes such as aminoplast polymerization. The techniques disclosed, generally referred to as an in situ polymerization reaction, yield for example, an aminoplast resin capsule wall material. In the process, a hydrophobic oil phase is dispersed in an aqueous phase containing the aminoplast resin precursors by applying high shear agitation. Addition of an acid catalyst initiates the polycondensation of the aminoplast precursors, resulting in the deposition of the aminoplast resin about the dispersed droplets of the oil phase, producing the microcapsules. The hydrophobic inner phase for the capsule may be any in situ aminoplast encapsulatable composition as discussed in U.S. Pat. No. 3,516,941. The material to be encapsulated may be fluid, semi-solid (e.g., gel), waxy or low melting (less than 100° C.) solid carrier phase. Typical materials may be fragrance oils, mineral oils, emollients such as isopropyl myristate, plasticizers such as the phthalate esters, waxes such as found in lipsticks, etc. Optionally, the fill material may be removed to provide hollow capsules.

When the microcapsule is prepared by interfacial polycondensation, the capsule skin may be composed of any condensation polymer or addition polymer, e.g., polyamide, polyurethane, polysulfonamide, polyurea, polyester, polycarbonate, etc. Polyamides prepared by interfacial polycondensation of an amine with an acid chloride or polymers formed by reaction of isocyanate prepolymer with polyamines are preferred. Microcapsules formed by coacervation processes are also useful in forming microcapsule shells according to the present invention. Coacervation is the well known process of forming higher molecular weight gelatin polymers as taught in U.S. Pat. Nos. 5,800,458 and 2,800,457.

The compositions of the present invention are prepared by making the microcapsules and the cosmetic compositions separately and then mixing the two under conditions which will not rupture a significant (e.g., greater than 5% or 10%) portion of the capsules. Preferably, fewer than 1% of the capsules will be broken during preparation of the final composition. The percentage of capsules and pigments in the composition can vary widely depending on the intensity of the desired effect, the optical intensity of the various pigments, and other aesthetic objectives. Generally, the microcapsules should comprise from 10–90% dry weight of the composition, preferably between 25 and 75% dry weight of the composition.

The capsules used in the practice of the present invention have average diameters between 1 and 70 microns. Preferably the average diameters are between 11 and 25 microns. The capsules preferably constitute from 20 to 60% by weight of the composition, and most preferably between 25 and 50% by weight of said composition.

In the manufacture of washable compositions, the non-color imparting component of the composition should be reversably water soluble. In other words, the carrier should not be crosslinking or drying after applicatoin to the substrate in the sense that it will permanently adhere to a substrate or form a permanent entrainment of portions of the substrate such that the carrier is not removable by ordinary washing. On the other hand, the composition should contain some form of binder to assist in temporarily adhering the colorant particle to the intended substrate. Preferably, the binder is removable by washing with water or water and shampoo. Examples of such appropriate binder components include viscosity builders or conventional binders such as sodium polyacrylic acids, or polymethacrylic acids in moderate molecular weight ranges, starches, polyvinyl alcohol, methoxylated polymeric materials, natural gums, acrylate polymers and the like. Examples of polymers that may be incorporated as substantive agents for holding the particles or microcapsules on the intended substrate are disclosed in U.S. Pat. No. 4,172,122 to Kubik et. al., U.S. Pat. No. 5,032,460 Kumar, U.S. Pat. No. 4,972,037 to Garbe et. al., U.S. Pat. No. 4,981,902 to Mitra et. al. and U.S. Pat. No. 4,981,903 to Garbe et. al.

Optionally, the washable composition may additionally include humectants, plasticizers, fragrances, or other conventional components added to water-soluble paints, or hair colorant compositions.

For assistance in formulating acceptable hair colorant compositions, one may refer to any number of cosmetic formulary texts to determine appropriate components for use on the human hair while achieving the properties of sprays, gels, mousses, or other appropriate carrier formulations. Alternatively, the particles or colored microcapsules may be incorporated in conventional off-the-shelf hair care formulations such as sprays, gels, mousses and the like.

Surprisingly, it has been found that the addition of particles or microcapsules as described herein to conventional hairspray formulations provides both effective color delivery and extremely good washability. When the binder material incorporated in the hair spray is no more substantive to hair than conventional polymers used in hair sprays, it has been found that the colorant is washable from hair tresses using only a cold water rinse, without the need for a warm water shampoo. It will be appreciated that the degree of washability can be optimized by incorporation of more substantive polymers as noted above.

The hair colorant compositions of the present invention also advantageously may be modified in color intensity by brushing of the hair. Because the colorants are removably adhered to the hair, brushing or combing will remove at least a portion of the colorant materials. Hair colorant compositions containing microcapsules particularly may exhibit this reduction in perceived color. While not being bound by theory, it is believed that brushing or combing the hair will rupture at least a portion of the microcapsules, substantially reducing the volume of the colorant imparting the perceived color.

A general formula for preparing washable formulations is as follows.

| Ingredient | |
| --- | --- |
| D.I. Water | 40.6 |
| Defoamer | 0.16 |
| Dextrine | 8.2 |
| Hydrous Magnesium Silicate | 0–6.4 |
| Na Naphthalene Sulfonic Acid (23%) | 0.31 |
| Na Salt of Polymeric Carboxylic Acid (25%) | 0.23 |

| Ingredient | -continued |
| --- | --- |
| Diatomaceous Silica | 0–16.52 |
| 2-hydroxy propyl ether starch | 2.56 |
| Grind, then add: | |
| Particles or Microcapsules | 8.5–20.0 |
| D.I. Water | 3.95 |
| Sodium tetra decyl sulfate (27%) | 0.04 |
| 3-iodo-2-propynyl butyl carbonate (40%) | 0.15 |
| Oxazolidine Hemiformal Solution (50%) | 0.30 |
| 5-chloro-2-methyl-4-isothiazolin-3-one(4%) | 0.15 |

The following examples are provided for purposes of illustrating the invention, and are not to be considered as limiting the scope in any manner. Unless otherwise noted, all amounts, ratios and percentages are by weight.

EXAMPLES

Preparation of Precondensate

A four liter stainless steel beaker equipped with a stirrer and a water bath was charged with 2916 parts of formalin (formaldehyde content 37%), 928 parts of urea, 164 parts of melamine and 9.54 parts of potassium tetraborate. The temperature of the water bath was raised to 75° C. while the reaction mixture was agitated. A reaction was carried out at this temperature for 2.5 hours. At this point, the reaction mixture was added to 4992 parts of water in a 5 gallon plastic pail. This mixture was cooled, and stored at room temperature for 24 hours before further use. This reacted product hereafter will be referred as "precondensate".

EXAMPLE 1

To 800 parts of the above precondensate, 0.75 parts of carboxymethyl cellulose (CMC) was charged while agitating at 2800 rpm with a high shear mixer. The temperature of this reaction mixture was adjusted to 21° C. and 30 parts of 10% hydrochloric acid (HCl) was charged to it with continued high shear mixing. To effect the hardening of the resin, the reaction mixture was heated at 21° C., 40° C., and 60° C. for 7, 5, and 3 hours respectively. This solution was neutralized to pH 7.0–8.5 with ammonium hydroxide after completion of the reaction.

The finely divided resin was separated by filtration and air dried overnight to yield 145 parts of white pigmented resin particles. Mean particle size (analyzed by Coulter Particle Analyzer Model No. LS130) for these particles is 11.0 micron.

Examples 2–7 were prepared by following the procedure of Example 1 and are listed in Table 1 except for the amount of CMC and dye incorporated. Dye is added as indicated immediately after addition of CMC.

TABLE 1

| Ex. No. | Name of Dye | Dye (g) | Particle size | CMC (g) |
| --- | --- | --- | --- | --- |
| 2 | FD & C3 | 4.0 | 14.43 | 0.5 |
| 3 | Nigrosine | 4.0 | 19.26 | 0.5 |
| 4 | FD & C 4 | 5.0 | 68.37 | 0.8 |
| 5 | FD & C 33 | 5.0 | 92.31 | 0.8 |
| 6 | FD & C 1 | 10.0 | 76.77 | 0.75 |
| 7 | Nigrosine | 10.0 | 8.72 | 0.75 |

EXAMPLE 8

To 800 parts of the precondensate were charged 0.50 parts of CMC, 20 parts of colloidal silica (Nalco 1034A), 2.77 parts of FD&C Yellow 6 (C. I. No. 15985), 7.07 parts of Nigrosine, and 5.12 parts of Acid Blue 9 (C. I. No. 42090) while agitating at 2800 rpm with a high shear mixer. The temperature of this reaction mixture was adjusted to 21° C. and 30 parts of 10% hydrochloric acid (HCl) was charged to it. To effect the hardening of the resin, the reaction mixture was heated at 21° C., 40° C., and 60° C. for 7, 5, and 3 hours respectively. This solution was neutralized to pH 7.0–8.5 with ammonium hydroxide after completion of the reaction.

The finely divided resin was separated by filtration and air dried overnight to yield 150 parts of black pigmented resin particles. Mean particle size (analyzed by Coulter Particle Analyzer Model No. LS130) for these particles is 7.7 micron.

EXAMPLE 9

To 800 parts of the precondensate were charged 0.50 parts of CMC, 20 parts of colloidal silica (Nalco 1034A), and 15 parts of Acid Yellow 23 (C. I. No. 19140) while agitating at 2800 rpm with a high shear mixer. The temperature of this reaction mixture was adjusted to 21° C. and 30 parts of 10% hydrochloric acid (HCl) was charged to it. To effect the hardening of the resin, reaction mixture was heated at 21° C., 40° C., and 60° C. for 7, 5, and 3 hours respectively. This solution was neutralized to pH 7.0–8.5 with ammonium hydroxide after completion of the reaction.

The finely divided resin was separated by filtration and air dried overnight to yield 150 parts of yellow pigmented resin particles. Mean particle size (analyzed by Coulter Particle Analyzer Model No. LS130) for these particles is 10.02 micron.

EXAMPLE 10

To 800 parts of the precondensate were charged, 60 parts of colloidal silica (Nalco 1034A), 10 parts of Acid Blue 9 (C. I. No. 42090) while agitating at 2800 rpm with a high shear mixer. The temperature of this reaction mixture was adjusted to 21° C. and 30 parts of 10% hydrochloric acid (HCl) was charged to it. To effect the hardening of the resin, reaction mixture was heated at 21° C., 40° C., and 60° C. for 7, 5, and 3 hours respectively. This solution was neutralized to pH 7.0–8.5 with ammonium hydroxide after completion of the reaction.

The finely divided resin was separated by filtration and air dried overnight to yield 150 parts of blue pigmented resin particles. Mean particle size (analyzed by Coulter Particle Analyzer Model No. LS130) for these particles is 6.88 micron.

EXAMPLE 11

To 800 parts of the precondensate were charged, 30 parts of colloidal silica (Nalco 1034A), 10 parts of FD&C 4 (C. I. No. 14700) while agitating at 2800 rpm with a high shear mixer. The temperature of this reaction mixture was adjusted to 21° C. and 30 parts of 10% hydrochloric acid (HCl) was charged to it. To effect the hardening of the resin, reaction mixture was heated at 21° C., 40° C., and 60° C. for 7, 5, and 3 hours respectively. This solution was neutralized to pH 7.0–8.5 with ammonium hydroxide after completion of the reaction.

The finely divided resin was separated by filtration and air dried overnight to yield 150 parts of red pigmented resin particles.

EXAMPLE 12

To 800 parts of the precondensate were charged, 30 parts of colloidal silica (Nalco 1034A), and 10 parts of Acid Violet 17 (C. I. No. 42650) while agitating at 2800 rpm with a high shear mixer. After mixing thoroughly, 30 parts of 10% hydrochloric acid (HCl) was added to it and reaction was continued for 2 hours. At this point, additional 6 parts of 10% HCl was charged, and reaction was continued further for 3 hours. To effect the hardening of the resin, temperature of the reaction was raised to 60° C. and held for additional 3 hours. This solution was neutralized to pH 7.0–8.5 with ammonium hydroxide after completion of the reaction.

The finely divided resin was separated by filtration and air dried overnight followed by heating at 100° C. for 2 hours to yield 147 parts of violet pigmented resin particles. Mean particle size (analyzed by Coulter Particle Analyzer, Model No. LS130) for these particles is 15.25 micron.

EXAMPLE 13

To 800 parts of precondensate were charged, 15 parts of colloidal silica (Nalco 1034A), and 1.16 parts of Acid Blue 9 (C. I. No. 42090), and 7.84 parts of Acid yellow 17 (C. I. No. 18835) while agitating at 2800 rpm with a high shear mixer. The temperature of this reaction mixture was adjusted to 21° C. and 8 parts of glutaric dialdehyde (25% water solution) was charged to it. After mixing thoroughly, 30 parts of 10% hydrochloric acid (HCl) was added to it and reaction was continued for 2 hours. At this point, additional 6 parts of 10% HCl was charged, and reaction was continued further for 3 hours. To effect the hardening of the resin, temperature of the reaction was raised to 60° C. and held for additional 3 hours. This solution was neutralized to pH 7.0–8.5 with ammonium hydroxide after completion of the reaction. The finely divided resin was separated by filtration and air dried overnight followed by heating at 100° C. for 2 hours to yield 147 parts of green pigmented resin particles. Mean particle size (analyzed by Coulter Particle Analyzer, Model No. LS130) for these particles is 23.87 micron.

EXAMPLE 14

To 800 parts of precondensate were charged, 15 parts of colloidal silica (Nalco 1034A), and 9 parts of FD&C Yellow 6 (C. I. No. 15985) while agitating at 2800 rpm with a high shear mixer. The temperature of this reaction mixture was adjusted to 21° C. and 8 parts of glutaric dialdehyde (25% water solution) was charged to it. After mixing thoroughly, 30 parts of 10% hydrochloric acid (HCl) was added to it and reaction was continued for 2 hours. At this point, additional 6 parts of 10% HCl was charged, and reaction was continued further for 3 hours. To effect the hardening of the resin, temperature of the reaction was raised to 60° C. and held for additional 3 hours. This solution was neutralized to pH 7.0–8.5 with ammonium hydroxide after completion of the reaction.

The finely divided resin was separated by filtration and air dried overnight followed by heating at 100° C. for 2 hours to yield 150 parts of orange pigmented resin particles. Mean particle size (analyzed by Coulter Particle Analyzer, Model No. LS130) for these particles is 14.59 micron.

EXAMPLE 15

To 800 parts of precondensate were charged, 30 parts of colloidal silica (Nalco 1034A), and 6.3 parts of Acid Violet 12, and 2.7 parts of Acid Violet 17 (C. I. No. 42650) while agitating at 2800 rpm with a high shear mixer. The temperature of this reaction mixture was adjusted to 21° C. and 8 parts of glutaric dialdehyde (25% water solution) was charged to it. After mixing thoroughly, 30 parts of 10% hydrochloric acid (HCl) was added to it and reaction was continued for 2 hours. At this point, additional 6 parts of 10% HCl was charged, and reaction was continued further for 3 hours. To effect the hardening of the resin, temperature of the reaction was raised to 60° C. and held for additional 3 hours. This solution was neutralized to pH 7.0–8.5 with ammonium hydroxide after completion of the reaction.

The finely divided resin was separated by filtration and air dried overnight followed by heating at 100° C. for 2 hours to yield 147 parts of violet pigmented resin particles. Mean particle size (analyzed by Coulter Particle Analyzer Model No. LS130) for these particles is 13.49 micron.

EXAMPLE 16

To 800 parts of the precondensate were charged, 15 parts of colloidal silica (Nalco 1034A), and 1.16 parts of Acid Blue 9 (C. I. No. 42090), and 7.84 parts of Acid yellow 17 (C. I. No. 18835) while agitating at 2800 rpm with a high shear mixer. The temperature of this reaction mixture was adjusted to 21° C. and 30 parts of 10% hydrochloric acid (HCl) was charged to it. To effect the hardening of the resin, reaction mixture was heated at 21° C., 40° C., and 60° C. for 7, 5, and 3 hours respectively. This solution was neutralized to pH 7.0–8.5 with ammonium hydroxide after completion of the reaction.

The finely divided resin was separated by filtration and air dried overnight followed by heating at 100° C. for 2 hours to yield 147 parts of green pigmented resin particles. Mean particle size (analyzed by Coulter Particle Analyzer, Model No. LS130) for these particles is 20.09 micron.

EXAMPLE 17

To 800 parts of the precondensate were charged, 15 parts of colloidal silica (Nalco 1034A), and 9 parts of FD&C Yellow 6 (C. I. No. 15985) while agitating at 2800 rpm with a high shear mixer. The temperature of this reaction mixture was adjusted to 21° C. and 30 parts of 10% hydrochloric acid (HCl) was charged to it. To effect the hardening of the resin, reaction mixture was heated at 21° C., 40° C., and 60° C. for 7, 5, and 3 hours respectively. This solution was neutralized to pH 7.0–8.5 with ammonium hydroxide after completion of the reaction.

The finely divided resin was separated by filtration and air dried overnight followed by heating at 100° C. for 2 hours to yield 147 parts of orange pigmented resin particles. Mean particle size (analyzed by Coulter Particle Analyzer, Model No. LS130) for these particles is 17.85 micron.

Preparation of Concentrated Precondensate

A four liter stainless steel beaker equipped with a stirrer and a water bath was charged with 1676 parts of formalin (formaldehyde content 37%), 52 parts of urea, 96 parts of melamine and 5.48 parts of potassium tetraborate. The temperature of the water bath was raised to 75° C. while the reaction mixture was agitated. The reaction was carried out at this temperature for 2.5 hours. At this point, 1136 parts of water was added to this beaker. It was cooled, and stored at room temperature for 24 hours before further use. This reacted product hereafter will be referred as "Concentrated Precondensate."

EXAMPLE 18

To 800 parts of the above concentrated precondensate was charged, 40 parts of colloidal silica (Nalco 1034A), and 10 parts of Acid Blue 9 while agitating it at 2800 rpm with a high shear mixer. The temperature of this reaction mixture was adjusted to 21° C. and 8 parts of glutaric dialdehyde (25% water solution) was charged to it. After mixing thoroughly, 30 parts of 10% hydrochloric acid (HCl) was added and the reaction was continued for 2 hours. At this point, an additional 6 parts of 10% HCl was charged, and the reaction was continued further for 3 hours. To effect the hardening of the resin, the temperature of the reaction was raised to 60° C. and held for an additional 3 hours. This solution was neutralized to pH 7.0–8.5 with ammonium hydroxide after completion of the reaction.

The finely divided resin was separated by filtration and air dried overnight, followed by heating at 100° C. for 2 hours to yield 240 parts of blue pigmented resin particles. Mean particle size (analyzed by Coulter Particle Analyzer, Model No. LS130) for these particles is 10 micron.

Preparation of Concentrated Instant Precondensate

A one liter stainless steel beaker equipped with a stirrer was charged with 532 parts of formalin (formaldehyde content 37%), 170 parts of urea, 30 parts of melamine, and 267 parts of water. This product hereafter will be referred as "Concentrated Instant Precondensate."

EXAMPLE 19

To 999 parts of the Concentrated Instant Precondensate was charged 40 parts of colloidal silica (Nalco 1034A), and 10 parts of Acid Blue 9 while agitating at 2200 rpm with a high shear mixer. The temperature of this reaction mixture was adjusted to 21° C. and 10 parts of glutaric dialdehyde (25% water solution) was charged to it. After 5 minutes of mixing, 50 parts of 10% hydrochloric acid (HCl) was added and the reaction was continued for overnight. To effect the hardening of the resin, the temperature of the reaction was raised to 40° C. for 1.5 hour and then to 60° C. for 2 hours. This solution was neutralized to pH 7.0–8.5 with ammonium hydroxide after completion of the reaction.

The finely divided resin was separated by filtration and air dried overnight followed by heating at 100° C. for 2 hours to yield 280 parts of blue pigmented resin particles. Mean particle size (analyzed by Coulter Particle Analyzer, Model No. LS130) for these particles is 9 microns.

EXAMPLE 20

To 999 parts of the Concentrated Instant Precondensate solution was charged 40 parts of colloidal silica (Nalco 1034A) and 10 parts of Acid Blue 9 while agitating at 2200 rpm with a high shear mixer. The temperature of this reaction mixture was adjusted to 21° C. and 10 parts of glyoxal (40% water solution) was charged to it. After 5 minutes of mixing, 50 parts of 10% hydrochloric acid (HCl) was added and the reaction was continued for overnight. To effect the hardening of the resin, the temperature of the reaction was raised to 40° C. for 1.5 hour and then to 60° C. for 2 hours. This solution was neutralized to pH 7.0–8.5 with ammonium hydroxide after completion of the reaction.

The finely divided resin was separated by filtration and air dried overnight followed by heating at 100° C. for 2 hours to yield 280 parts of blue pigmented resin particles. Mean particle size (analyzed by Coulter Particle Analyzer, Model No. LS130) for these particles is 17 microns.

EXAMPLE 21

A one liter stainless steel beaker equipped with a stirrer was charged with 532 parts of formalin (formaldehyde content 37%), 170 parts of urea, 30 parts of melamine, and 267 parts of water. This material is heated at 75° C. for two hours then cooled to 21° C. To 999 of this solution was charged 40 parts of colloidal silica (Nalco 1034A) and 10 parts of Acid Blue 9 while agitating at 2200 rpm with a high shear mixer. The temperature of this reaction mixture was adjusted to 21° C. and 10 parts of glutaric dialdehyde (25% water solution) was charged to it. After 5 minutes of mixing, 50 parts of 10% hydrochloric acid (HCl) was added and the reaction was continued for overnight. To effect the hardening of the resin, the temperature of the reaction was raised to 40° C. for 1.5 hour and then to 60° C. for 2 hours. This solution was neutralized to pH 7.0–8.5 with ammonium hydroxide after completion of the reaction.

The finely divided resin was separated by filtration and air dried overnight followed by heating at 100° C. for 2 hours to yield 280 parts of blue pigmented resin particles.

EXAMPLE 22

The following procedure was used to run a one liter encapsulation reaction using polymethylene urea chemistry to encapsulate mineral oil in a blue-red dyed shell.

| Precondensate recipe: | |
| --- | --- |
| 37% formaldehyde | 3739 gm (A) |
| Urea | 1190 gm (B) |
| Melamine | 210 gm (C) |
| Buffer (K2B407) | 12.3 gm (D) |
| Water | 6390 gm (E) |

Combine charges A, B, C and D. Cook at 165° F. for 2.5 hours with mild stirring. Pour into charge E.

| Encapsulation charges: | |
| --- | --- |
| (A) Precondensate | 598 ml |
| (B) Added Water | 18 ml |
| (C) Fill | 184 ml (Carnation Brand Mineral Oil-Witco Chemical Co.) |
| (D) Sodium Sulfate | 61.55 gm |
| (E) CMC 7L1 | 1.48 gm (Hercules) |
| (F) FD & C Blue #1 | 5.54 gm |
| (G) D & C Red #33 | 0.78 gm |
| (H) Gluteraldehyde, 25% | 6.16 |

Procedure:

Charge A, B, F and G to a 1 liter baffled reactor. Apply 2500 RPM with a Waring blender turbine and 70° F. and hold for 2-3 minutes to dissolve dyes. Slowly add D and E to the liquid vortex and hold for 10 minutes to insure solution. Add C and hold for 3-5 minutes to establish droplet size. Add H and maintain 2500 & 70° for an additional 3 minutes. Add 20% sulfuric acid dropwise to pH 3.2. Continue to stir at 70° for 3 hours at which time add more acid to pH 2.0±0.1. Hold for 8 hours followed by a temperature increase to 140° F. Hold for 3 hours followed by a pH adjustment to 7.5. The intensely colored product may be filtered, washed and dried to obtain a free-flowing powder.

COMPARATIVE EXAMPLE 1

An 8 ounce brown glass bottle was charged with 150 parts of benzoguanamine, 130 parts of formalin (37 wt% formaldehyde) and 0.52 parts of 10% aqueous solution of sodium carbonate. The mixture was tumbled in a laundrometer at 95° C. for 5 hours to obtain an aqueous liquid of a soluble and fusible resin.

Separately, an aqueous protective colloid solution was prepared by dissolving in 600 parts of water, 8.5 parts of Kuraray Poval 205, a partially (87-89 mol%) saponified product of polyvinyl acetate (degree of polymerization 500). After raising the temperature of this aqueous solution to 90° C., it was stirred at 5000 rpm with a high shear mixer (Silverson Homogenizer L4R). While this solution was being stirred, the forgoing aqueous liquid of soluble and fusible resin was introduced to the protective colloid solution to obtain a white emulsion. Excessive foaming was observed during this stage of the reaction. After cooling this emulsion to 40° C., 4 parts of Rhodamine B (C. I. No. 45172) was added following which the emulsion was stirred for 30 minutes at room temperature to obtain an aqueous emulsion of a dyed soluble and fusible resin.

This reaction mixture was transferred to a three-necked round bottomed flask equipped with a stirrer, a condenser, and a thermometer. A large piece (~70 gram) of dyed polymer was recovered from the bottom of the beaker which had not dispersed in the fine particle size. A liquid obtained by homogeneously dispersing 64.2 parts of water and 21.3 parts of Nalco 1034A colloidal silica was added to this emulsion. Next, after adding 3 parts of paratoluenesulfonic acid, the emulsion was held at 50° C. for 1.5 hours while stirring gently. The stirring was continued successively at 60° C., 70° C., 80° C., and 90° C. for 2 hours at each temperature to effect the hardening of the resin and obtain a suspension of dyed hardened resin.

The resin was separated from solution by filtration, and the filter cake was dried in an oven at 100° C. followed by heating at 150° C. to obtain 140 g of resin particles. These particles were separated by sieving through a 150 mesh (106 micron) mesh sieve, giving large size agglomerates (~85 g) as well as a fine powder having an average particle size of 53.06 micron.

COMPARATIVE EXAMPLE 2

An 8 ounce brown glass bottle was charged with 150 parts of benzoguanamine, 130 parts of formalin (37 wt% formaldehyde) and 0.52 parts of 10% aqueous solution of sodium carbonate. The mixture was tumbled in a laundrometer at 95° C. for 5 hours to obtain an aqueous liquid of a soluble and fusible resin.

Separately, an aqueous protective colloid solution was prepared by dissolving in 600 parts of water, 8.5 parts of Kuraray Poval 205, a partially (87-89 mol%) saponified product of polyvinyl acetate (degree of polymerization 500). After raising the temperature of this aqueous solution to 90° C., it was stirred at 7000 rpm with high shear mixer (Silverson Homogenizer L4R). While this solution was being stirred, the forgoing aqueous liquid of soluble and fusible resin was introduced to the protective colloid solution to obtain a white emulsion. Foaming was observed which kept increasing even after the charge of dye. After cooling this emulsion to 30° C., 4 parts of Add Blue 9 was added following which the emulsion was stirred for 30 minutes at room temperature to obtain an aqueous emulsion of a dyed soluble and fusible resin.

This reaction mixture was transferred to a three-necked round bottomed flask equipped with a stirrer, a condenser, and a thermometer. A liquid obtained by homogeneously dispersing 64.2 parts of water and 21.3 parts of Nalco 1034A colloidal silica was added to this emulsion. Next, after adding 40 parts of 1N sulfuric acid, the emulsion was held at 40° C. for 1.5 hours while stirring gently. The stirring was continued successively at 50° C., 60° C., 70° C., 80° C., and 90° C. for 2 hours at each temperature to effect the hardening of the resin and obtain a suspension of dyed hardened resin.

The resin was separated from solution by filtration, and the filter cake was dried in an oven at 100° C. followed by heating at 150° C. to obtain 160 g of resin particles which have agglomerates. Average particle size for these particles is 31.99 micron.

TEST PROTOCOLS

Applying Paint to Fabric

Number 419 woven 100% cotton combed broadcloth and number 9406 woven 50/50 cotton/polyester (from TestFabrics, Inc., Middlesex, N.J.) with dimensions measuring 133 inches by 63 inches was prewashed, dried, and ironed according to ASTM 4265. This fabric was then cut into test sections with dimensions measuring 6 inches by 7 inches. A piece of the test fabric was loosely mounted on a 3" diameter beaker with a rubber band. This beaker was placed on a balance and zeroed. Using a dropper, 1.0 g of paint was then deposited dropwise on the fabric in a circle, taking care that no drops of the paint were placed on top of each other. The paint was then immediately spread to a 3 inch diameter circle with a paint brush in the vertical and horizontal directions to insure a uniform deposit of colorant over the surface. The paint was air dried at room temperature for four hours.

Test Fabric Laundering

A washing machine (as designated in ASTM D4265) was filled with 105° F. water, at setting of 12 minutes, normal wash cycle, maximum water level, and cold water rinse. 100 grams of Tide (Proctor and Gamble) detergent was added to the washer. The detergent was dissolved in the water while the machine is filling. Fabric test sections were fastened to dry fabric such as lab coats using a plastic fastener staple gun so that test pieces are exposed to normal laundering conditions. After the machine was filled and the agitation cycle began, the lab coats were placed with the attached samples into the washing machine. A sufficient amount of additional fabric was placed in the washer to provide a total of about four pounds of washing load. At the completion of washing cycle, test pieces were removed, flattened with the hand, and air dried overnight.

Evaluation of Residual Fabric Staining

The test fabric was analyzed using CIELAB coordinates measured by means of a Hunter Labscan colorimeter. The colorimeter was adjusted to the following settings.

10 degree viewer
D65 illuminant
½ inch diameter viewing aperture
UV filter

The instrument was then calibrated to zero reflectance with a black tile and 100% reflectance with a white tile. Both the control (white fabric) and the stained test sample were evaluated according to the following procedure. The fabric test sample was folded lengthwise and widthwise to present a four fold thickness of fabric to be inserted into the light source of the instrument. A white tile was then placed over the fabric sample and the CIELAB data was obtained from the colorimeter. The color difference (ΔE,ab) of each test sample stain was calculated according to the following equation:

$$\Delta E^{*}ab = \sqrt{[(\Delta L^{*})^2 + (\Delta a^{*})^2 + (\Delta b^{*})^2]}$$

where delta E*ab represents the difference in color between the standard fabric and stained test fabric and delta L*, delta a*, and delta b* terms are the color coordinates. The delta L* term represents the lightness of the color (stain), the delta a* term represents the redness or greenness of the stain, and the deltab* term represents the yellowness or blueness of the stain. For a further discussion see "Principles of Color Technology", second Ed., F. W. Billmeyer and M. Saltzmann, pages 59 through 60 and 102 through 104.

Washable paints were prepared from the following formulation, using particles as described in Examples 2–7. Table 2 shows delta E values for residual stains on fabric for these paints, wherein the formula of the paint is as provided below, with amount of particle content as indicated in the Table.

Experimental Paint Compositions

| Ingredient | |
|---|---|
| D.I. Water | 40.6 |
| Defoamer | .16 |
| Dextrine | 8.2 |
| Hydrous Magnesium Silicate | 0–6.4 |
| Na Naphthalene Sulfonic Acid (23%) | .31 |
| Na Salt of Polymeric Carboxylic Acid (25%) | .23 |
| Diatomaceous Silica | 0–16.52 |
| 2-hydroxy propyl ether starch | 2.56 |
| Grind, then add: | |
| Particles Acording to examples | as indicated |
| D.I. Water | 3.95 |
| Sodium tetra decyl sulfate (27%) | .04 |
| 3-iodo-2-propynyl butyl carbonate (40%) | .15 |
| Oxazolidine Hemiformal Solution (50%) | .30 |
| 5-chloro-2-methyl-4-isothiazolin-3-one(4%) | .15 |

TABLE 2

| Example # | Delta E 419 | Delta E 9406 |
|---|---|---|
| 2 | 5.80 | 2.64 |
| 3 | 2.51 | 0.57 |
| 4 | 2.58 | 2.04 |
| 5 | 5.28 | 2.28 |
| 6 | 0.46 | 0.43 |

TABLE 2-continued

| Example # | Delta E 419 | Delta E 9406 |
|---|---|---|
| 7 | 13.88 | 6.71 |

Table 3 shows delta E values for residual stains on fabric for the paints prepared from pigments described in Example 8–17, using the same paint formulation as provided above.

TABLE 3

| Example No. | Delta E 419 Fabric | Delta E 9406 Fabric | % Pigment in Paint |
|---|---|---|---|
| 8 | 3.20 | 1.08 | 8.00 |
| 9 | 3.10 | 1.46 | 8.00 |
| 10 | 3.10 | 0.84 | 14.00 |
| 11 | 3.55 | 0.92 | 16.00 |
| 12 | 2.44 | 1.60 | 12.00 |
| 13 | 0.16 | 0.12 | 20.00 |
| 14 | 3.48 | 1.14 | 14.52 |
| 15 | 2.93 | 1.02 | 15.90 |
| 16 | 0.92 | 0.59 | 20.00 |
| 17 | 3.30 | 0.90 | 14.25 |

Experimental Hair Colorant Compositions

A hair spray composition was prepared by adding 32 micron microcapsules incorporating D&C Red #33 to a commercially available hair spray comprising SD Alcohol 40 (SDA-CA-2877), Aloe Vera Extract, Ethyl Ester of PVM/MA Copolymer, Dimethicone Copolyol, Kelp Extract, Keratin Amino Acids, Glucose, Glutamate, Panthenol, Fragrance, Aminomethyl Propanol, Benzophenone-4. This composition was found to impart excellent color to the hair and was easily washed out with a single washing.

A hair gel composition was prepared by adding 20 micron microcapsules incorporating D&C Brown #1 to a commercially available hair gel composition comprising Herbal Extract complex, (Aloe Vera, cucumber, calendula, comfrey, white ginger, coconut, almond, mango fruit, rice Bran), PVP/VA copolymer, oleth-20, Glycerine, propylene glycol, diazolidinyl urea, methylparaben, propylparaben, acetamide mea, carbomer 940, triethanolamine, octyl methoxycinnamate, panthenol, fragrance. This composition was found to impart excellent color to the hair and was easily washed out with a single washing.

Dye Retention in Reaction Mother Liquor

To show the superior dye take up of reaction solutions containing a dialdehyde, reactions were carried out as in Example 15 using the concentrated precondensate.

A- melamine/urea/formaldehyde/glutaradehyde
B- benzguanamine/urea/formaldehyde/glutaradehyde To show the superior dye take up of reaction solutions containing a dialdehyde, reactions were carried out as in Example 10 using the concentrated precondensate.

C- melamine/urea/formaldehyde without glutaradehyde
D- benzguanamine/urea/formaldehyde without glutaradehyde Dye levels for FD&C Blue #1 reaction mother liquors were measured by UV-vis spectrophotometer at 630 wave length:

| Sample | A630 | dilution factor | Residual ppm |
|---|---|---|---|
| A Melamine/Urea/HCHO/Glu | 0.682 | 1 | 4.82 |
| B Benzguanamine/Urea/HCHO/Glu | 0.724 | 4 | 20.5 |
| C Melamine/Urea/HCHO | 0.730 | 16 | 82.6 |
| D Benzguanamine/Urea/HCHO | 0.625 | 16 | 70.7 |

These levels were calculated using the relation ppm = 7.091*A630 −0.0156.

What is claimed is:

1. A process for making solid colored particles comprising
   a) preparing a reaction solution in water comprising
      i) formaldehyde,
      ii) urea,
      iii) a cyclic polyamine functional triazine compound, and
      iv) acid to form a reaction solution having only a water phase and a polymer phase and
   b) heating said reaction solution under high shear mixing to polymerize the reactive components of said reaction solution, thereby forming particles having a mean particle size between 1 and 100 microns without the need for post-reaction physical processing to break up agglomerates.

2. The process of claim 1, wherein said acid is added after first mixing the formaldehyde, urea and cyclic polyamine functional triazine compound.

3. The process of claim 1, wherein a dye is additionally added to said precondensate before polymerization of said reactive components.

4. The process of claim 1, wherein an anti-agglomeration agent is additionally provided in said precondensate before polymerization of said reactive components.

5. The process of claim 4, wherein the anti-agglomeration agent is selected from the group consisting of colloidal silica, carboxy methyl cellulose and polyvinyl alcohol.

6. The process of claim 1, wherein a C 2–6 dialdehyde is additionally added to said precondensate before polymerization of said reactive components.

7. The process of claim 6, wherein said dialdehyde is glutaraldehyde.

8. The process of claim 1, wherein said reaction solution additionally comprises a C 2–5 aldehyde.

9. The process of claim 1, wherein said cyclic polyamine functional triazine compound is melamine.

10. The process of claim 1, wherein said cyclic polyamine functional triazine compound is benzguanamine.

11. The process of claim 3, wherein said dye is water-soluble.

12. The process of claim 3, wherein said dye contains acid-functionality.

13. The process of claim 3, wherein said particles are heated for time and temperature sufficient to reduce the water content of the particles below about 2% by weight.

14. Solid colored particles made in accordance with the process of claim 1.

15. Particles according to claim 13 having a mean particle size of 11–25 microns.

16. The process of claim 1, wherein said particles have a mean particle size of between 1 and 70 microns.

* * * * *